US006908964B2

(12) United States Patent
Adedeji et al.

(10) Patent No.: US 6,908,964 B2
(45) Date of Patent: Jun. 21, 2005

(54) METHOD FOR THE PREPARATION OF A POLY(ARYLENE ETHER)-POLYOLEFIN COMPOSITION, AND COMPOSITION PREPARED THEREBY

(75) Inventors: Adeyinka Adedeji, Albany, NY (US); John C. Haylock, Reston, VA (US); Robert Hossan, Delmar, NY (US); William Eugene Pecak, Cohoes, NY (US); Mark Victor Vendon, Westerlo, NY (US)

(73) Assignee: General Electric, Pittsfield, MA (US)

( * ) Notice: Subject to any disclaimer, the term of this patent is extended or adjusted under 35 U.S.C. 154(b) by 94 days.

(21) Appl. No.: 10/617,849

(22) Filed: Jul. 10, 2003

(65) Prior Publication Data

US 2004/0082719 A1 Apr. 29, 2004

Related U.S. Application Data

(63) Continuation-in-part of application No. 09/682,929, filed on Nov. 1, 2001, now Pat. No. 6,627,701.

(60) Provisional application No. 60/258,894, filed on Dec. 28, 2000.

(51) Int. Cl.[7] .......... C08L 53/00

(52) U.S. Cl. .......... 525/68; 525/69; 525/89

(58) Field of Search .......... 525/68, 69, 89

(56) References Cited

U.S. PATENT DOCUMENTS

| | | | |
|---|---|---|---|
| 3,195,868 | A | 7/1965 | Loomans, et al. |
| 4,239,673 | A | 12/1980 | Lee, Jr. |
| 4,242,263 | A | 12/1980 | Lee, Jr. |

(Continued)

FOREIGN PATENT DOCUMENTS

| | | |
|---|---|---|
| EP | 0 326 895 A2 | 1/1989 |
| EP | 412.787 A2 A3 | 2/1991 |
| EP | 0 765 914 A1 | 5/1995 |
| EP | 1 029 876 | 9/1999 |
| GB | 1 559 262 | 12/1977 |
| JP | 63-113047 | 5/1988 |
| JP | 63-113049 | 5/1988 |
| JP | 63-113050 | 5/1988 |
| JP | 01-098647 | 4/1989 |
| JP | 03-259941 | 11/1991 |
| JP | 04-007357 | 1/1992 |
| JP | 04-028739 | 1/1992 |
| JP | 04-028740 | 1/1992 |
| JP | 04-279697 | 10/1992 |
| JP | 04-293942 | 10/1992 |
| JP | 05-070679 | 3/1993 |
| JP | 05-295184 | 11/1993 |
| JP | 06-009828 | 1/1994 |
| JP | 06-016924 | 1/1994 |
| JP | 06-057130 | 3/1994 |
| JP | 06-136202 | 5/1994 |
| JP | 07-003083 | 1/1995 |
| JP | 07-304908 | 12/1995 |
| JP | 09-316322 | 12/1997 |
| JP | 11-060836 | 3/1999 |
| JP | 2000-143891 | 5/2000 |
| JP | 2003277555 A | 10/2003 |
| WO | WO 90/05759 | 5/1990 |
| WO | WO 91/05016 | 4/1991 |

OTHER PUBLICATIONS

JP 06057008. Publication Date of Jan. 3, 1994. Abstract Only. (1 page).

Derwent Abstract for JP 58–93730.

Tuftec® H1043 Technical Bulletin, Dec. 16, 1999, Asahi Chemical Industry, Co., Ltd., pp. 1–5.

Tuftec ® P–Series High Performance Thermoplastic Elastomer, pp. 1–2. <http: www.asahi–kasei.co.jp/plastic/e/technical/br/p–series.htm>.

M. K. Akkapeddi and B. VanBuskirk, Adv. Polym. Technol. (1992), vol. 11, No. 4, pp. 263–275.

G.–X. Wei, H.–J. Sue, J. Chu, C. Huang, K. Gong, "Morphology and Mechanical Property of Poly(phenylene oxide) Modified Polypropylene Blends", ANTEC '99, vol. III, New York City, May 2nd–6th, 1999, pp. 3443–3447.

Chemical Abstracts Record for JP 03181555.

Chemical Abstracts Record for JP 03185058.

Chemical Abstracts Record for JP 03231962.

Chemical Abstracts Record for JP 04183748.

Chemical Abstracts Record for JP 07165998.

Chemical Abstracts Record for JP 07166026.

U.S. Appl. No. 09/682,919, filed Nov. 1, 2001, Adedeji et al.

U.S. Appl. No. 09/682,920, filed Nov. 1, 2001, Adedeji et al.

U.S. Appl. No. 09/682,921, filed Nov. 1, 2001, Adedeji et al.

U.S. Appl. No. 09/682,923, filed Nov. 1, 2001, Adedeji et al.

U.S. Appl. No. 09/682,926, filed Nov. 1, 2001, Adedeji et al.

U.S. Appl. No. 09/682,928, filed Nov. 1, 2001, Adedeji et al.

U.S. Appl. No. 09/683,766, filed Feb. 12, 2002, Adedeji et al.

U.S. Appl. No. 10/063,336, filed Apr. 12, 2002, Adedeji et al.

Chemical Abstract for JP 2003277555.

*Primary Examiner*—Jeffrey Mullis

(57) ABSTRACT

A poly(arylene ether)-polyolefin composition is prepared by melt-blending a poly(arylene ether), a poly(alkenyl aromatic) resin, a hydrogenated block copolymer of an alkenyl aromatic compound and a conjugated diene, and an unhydrogenated block copolymer of an alkenyl aromatic compound and a conjugated diene to form a first blend, and melt-blending the first blend and a polyolefin and additional hydrogenated block copolymer to form a second blend. A reinforcing filler and/or an ethylene/alpha-olefin elastomeric copolymer may, optionally, be added during formation of the second blend or in an additional step. Multiple mixing elements, low throughput, and high extruder rotations per minute may be used to achieve high energy mixing of the first and second blends. Compositions prepared by the method exhibit an improved balance of impact strength, stiffness, and heat resistance, as well as reduced variability of physical properties.

46 Claims, 1 Drawing Sheet

U.S. PATENT DOCUMENTS 4,299,757 A 11/1981 Kuribayashi et al.
4,383,082 A 5/1983 Lee, Jr.
4,460,743 A 7/1984 Abe et al.
4,565,684 A 1/1986 Tibbetts et al.
4,572,813 A 2/1986 Arakawa
4,663,230 A 5/1987 Tennent
4,713,416 A 12/1987 Del Giudice et al.
4,752,135 A 6/1988 Loomans
4,764,559 A 8/1988 Yamauchi et al.
4,772,657 A 9/1988 Akiyama et al.
4,816,289 A 3/1989 Komatsu et al.
4,863,997 A 9/1989 Shibuya et al.
4,876,078 A 10/1989 Arakawa et al.
4,892,904 A 1/1990 Ting
4,962,148 A 10/1990 Orikasa et al.
4,985,495 A 1/1991 Nishio et al.
4,990,558 A 2/1991 DeNicola, Jr. et al.
4,994,508 A 2/1991 Shiraki et al.
5,024,818 A 6/1991 Tibbetts et al.
5,061,753 A 10/1991 Maruyama et al.
5,071,911 A 12/1991 Furuta et al.
5,071,912 A 12/1991 Furuta et al.
5,075,376 A 12/1991 Furuta et al.
5,079,295 A 1/1992 Furuta et al.
5,081,187 A 1/1992 Maruyama et al.
5,086,112 A 2/1992 Togo et al.
5,106,696 A 4/1992 Chundury et al.
5,124,410 A 6/1992 Campbell
5,132,363 A 7/1992 Furuta et al.
5,149,740 A 9/1992 Maruyama et al.
5,159,004 A 10/1992 Furuta et al.
5,162,433 A 11/1992 Nishio et al.
5,162,435 A 11/1992 Shibuya et al.
5,162,440 A 11/1992 Akkapeddi et al.
5,165,909 A 11/1992 Tennent et al.
5,166,264 A 11/1992 Lee, Jr. et al.
5,182,151 A 1/1993 Furuta et al.
5,191,024 A 3/1993 Shibata et al.
5,206,281 A 4/1993 Furuta
5,262,477 A 11/1993 Kasai et al.
5,268,425 A 12/1993 Furuta et al.
5,272,208 A 12/1993 Shiraki et al.
5,272,209 A 12/1993 Shiraki et al.
5,278,220 A 1/1994 Vermeire et al.
5,286,791 A 2/1994 DeNicola, Jr. et al.
5,290,856 A 3/1994 Okamoto et al.
5,296,540 A 3/1994 Akiyama et al.
5,304,593 A 4/1994 Nishio et al.
5,321,081 A 6/1994 Chundury et al.
5,369,173 A 11/1994 Furuta
5,370,813 A 12/1994 DeNicola, Jr. et al.
5,397,822 A 3/1995 Lee, Jr. et al.
5,405,902 A 4/1995 Nishio et al.
5,418,287 A 5/1995 Tanaka et al.
5,424,360 A 6/1995 Nagaoka et al.
5,428,091 A 6/1995 Abe et al.
5,461,111 A 10/1995 Modic et al.
5,473,015 A 12/1995 DeNicola, Jr. et al.
5,494,962 A 2/1996 Gauthy et al.
5,589,152 A 12/1996 Tennent et al.
5,591,382 A 1/1997 Nahass et al.
5,593,227 A 1/1997 Scheuring et al.
5,648,424 A 7/1997 Miwa et al.
5,686,528 A 11/1997 Wills et al.
5,705,556 A 1/1998 Djiauw et al.
5,777,028 A 7/1998 Okada et al.
5,902,850 A 5/1999 Chino et al.
5,932,159 A 8/1999 Rauwendaal
5,998,029 A 12/1999 Adzima et al.
6,005,050 A 12/1999 Okada et al.
6,013,726 A 1/2000 Nakano et al.
6,031,049 A 2/2000 Chino et al.
6,045,883 A 4/2000 Akiyama et al.
6,057,401 A 5/2000 Modic
6,116,770 A 9/2000 Kiani et al.
6,258,881 B1 7/2001 Moritomi
6,300,417 B1 10/2001 Sue et al.
6,495,630 B2 * 12/2002 Adedeji et al. ............... 525/89
6,545,080 B2 * 4/2003 Adedeji et al. ............. 524/494
6,660,794 B2 * 12/2003 Adedeji et al. ............. 524/494
6,815,491 B2 * 11/2004 Adedeji et al. ............. 524/504
2002/0023845 A1 2/2002 Ding et al.
2002/0137840 A1 * 9/2002 Adedeji et al. ............... 525/88
2002/0156182 A1 * 10/2002 Adedeji et al. ............... 525/64
2003/0181587 A1 9/2003 Sasagawa et al.

* cited by examiner

METHOD FOR THE PREPARATION OF A POLY(ARYLENE ETHER)-POLYOLEFIN COMPOSITION, AND COMPOSITION PREPARED THEREBY

CROSS REFERENCE TO RELATED APPLICATIONS

This application is a continuation in part of U.S. application Ser. No. 09/682,929, flied Nov. 1, 2001, now U.S. Pat. No. 6,627,701 which claims the benefit of U.S. Provisional Application Ser. No. 60/258,894, filed Dec. 28, 2000.

BACKGROUND

Poly(arylene ether)-polyolefin compositions are well known. Many references teach the desirability of preparing these compositions by combining all components in a single mixing step. See, for example, U.S. Pat. No. 4,764,559 to Yamauchi et al.; U.S. Pat. No. 4,772,657 to Akiyama et al.; U.S. Pat. No. 4,863,997 to Shibuya et al.; U.S. Pat. No. 4,985,495 to Nishio et al.; U.S. Pat. No. 4,990,558 to DeNicola, Jr. et al.; U.S. Pat. Nos. 5,071,912, 5,075,376, 5,132,363, 5,159,004, 5,182,151, and 5,206,281 to Furuta et al.; U.S. Pat. No. 5,418,287 to Tanaka et al., and European Patent Application No. 412,787 A2 to Furuta et al.

Alternatively, some references teach the desirability of adding components in order of higher to lower viscosities. See, for example, U.S. Pat. Nos. 4,764,559 to Yamauchi et al., U.S. Pat. No. 4,985,495 to Nishio et al., and U.S. Pat. No. 5,418,287 to Tanaka et al.

In yet another proposed blending method, a polyphenylene ether and a polypropylene-graft-polystyrene copolymer, with or without unmodified polypropylene, are pre-mixed before one or more rubbery substances are added with additional mixing. See, for example, U.S. Pat. Nos. 5,071,912, 5,075,376, 5,132,363, 5,159,004, 5,182,151, and 5,206,281 to Furuta et al.; European Patent Application No. 412,787 A2 to Furuta et al.; and Japanese Unexamined Patent Application 63[1988]-113049 to Shibuya et al.

The above-described methods produce compositions that are inadequate for many commercial uses because they exhibit excessive variability in key properties, including stiffness and impact strength. There remains a need for a method of producing poly(arylene ether)-polyolefin compositions having improved property balances. In particular, there remains a need for a method of producing poly(arylene ether)-polyolefin compositions exhibiting reduced property variability and improved tradeoffs between stiffness, impact strength, and heat resistance.

BRIEF SUMMARY

The above described and other drawbacks and disadvantages of the prior art are alleviated by a method of preparing a thermoplastic composition, comprising: melt-blending to form a first intimate blend comprising a poly(arylene ether), a poly(alkenyl aromatic) resin, a hydrogenated block copolymer of an alkenyl aromatic compound and a conjugated diene; and an unhydrogenated block copolymer of an alkenyl aromatic compound and a conjugated diene; and melt-blending to form a second intimate blend comprising the first intimate blend, and a polyolefin.

Another embodiment is a method of preparing a thermoplastic composition, comprising: melt-blending to form a first intimate blend comprising a poly(arylene ether), a poly(alkenyl aromatic) resin, a hydrogenated block copolymer of an alkenyl aromatic compound and a conjugated diene; and an unhydrogenated block copolymer of an alkenyl aromatic compound and a conjugated diene; and melt-blending to form a second intimate blend comprising the first intimate blend, a polyolefin, and additional hydrogenated block copolymer.

Additional embodiments are described in detail below.

DETAILED DESCRIPTION OF THE PREFERRED EMBODIMENTS

Figure 1:
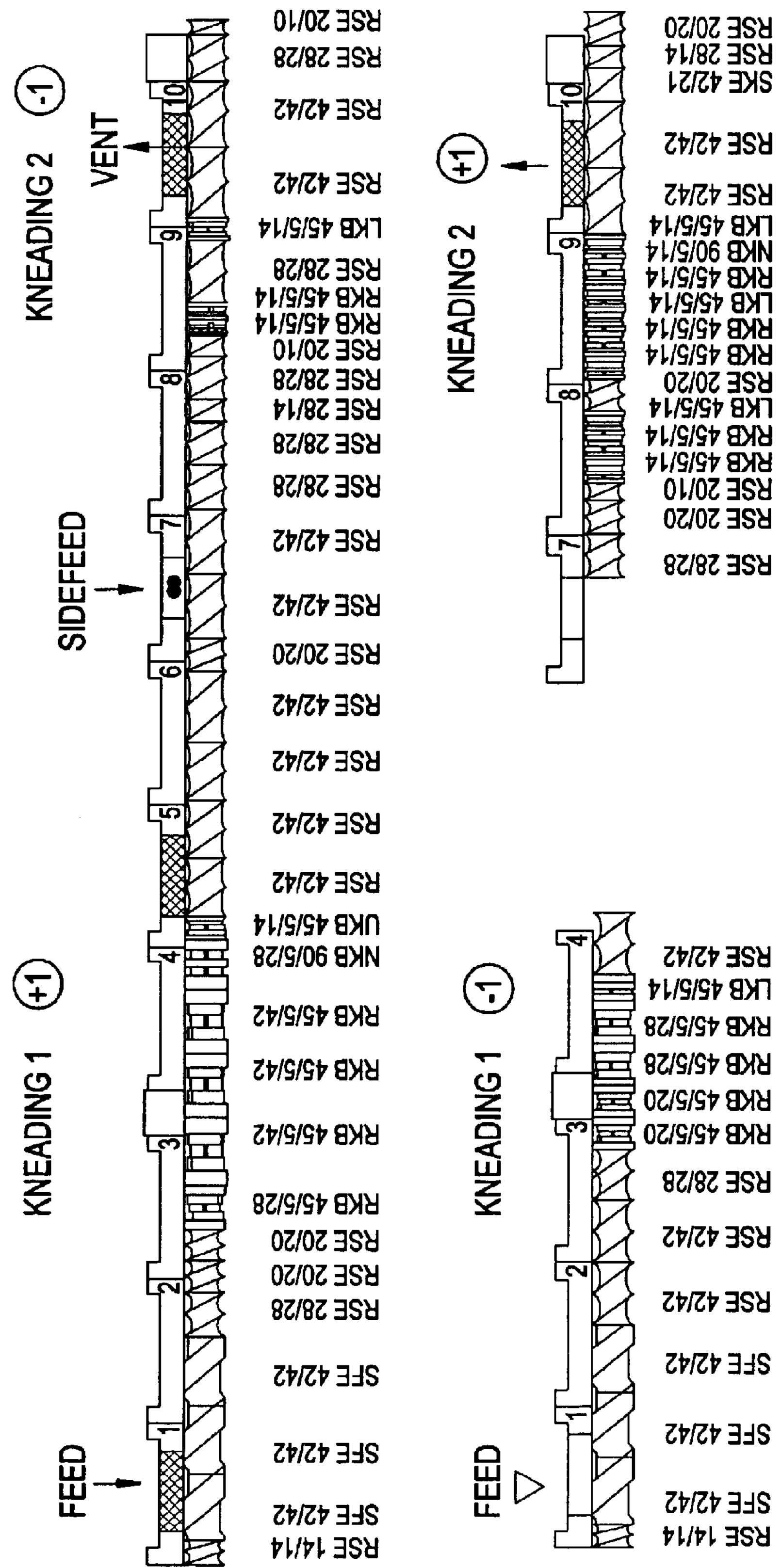
FIG. 1 is a diagrammatic view of kneading blocks used in high and low intensity upstream and downstream kneading.

One embodiment is a method comprising: melt-blending to form a first intimate blend comprising a poly(arylene ether), a poly(alkenyl aromatic) resin, a hydrogenated block copolymer of an alkenyl aromatic compound and a conjugated diene; and an unhydrogenated block copolymer of an alkenyl aromatic compound and a conjugated diene; and melt-blending to form a second intimate blend comprising the first intimate blend, and a polyolefin.

Extensive experiments by the present inventors have led to the surprising observation that the properties of the composition prepared according to this method are substantially and unexpectedly improved compared to compositions prepared by known methods, especially those methods in which all components are blended simultaneously.

In a preferred embodiment, melt-blending to form the first intimate blend comprises high-energy mixing. The energy of mixing may be expressed in various ways. One factor contributing to the energy of mixing is the extruder addition point. For example, when the composition is compounded on an eleven barrel twin-screw extruder, high-energy mixing of the first-intimate blend may be expressed as addition of first intimate blend components to one of the first four barrels.

Another factor contributing to the energy of mixing is the number of mixing sections, with greater numbers of mixing sections corresponding to higher energy mixing. Each mixing section may comprise at least one mixing element. The first intimate blend and the second intimate blend are each preferably formed using at least one mixing section. Mixing sections and mixing elements are generally well known in the art as components of twin-screw extruders. Each mixing element is disposed non-rotatably on a screw shaft and is used to disperse and distribute components of a thermoplastic composition throughout the blend. The mixing element may or may not advance the composition toward the outlet of the extruder. The present inventors have found that the properties of the composition are improved if the processes of mixing to form the first intimate blend and the second intimate blend each employ at least one mixing section. In a preferred embodiment, mixing to form the first intimate blend and the second intimate blend each employ at least two mixing elements on each screw shaft.

There is no particular limitation on the design of the individual mixing elements. Suitable mixing elements include, for example, mixing elements on each of said shafts which are in radial interwiping relation within the extruder barrel and configured to wipe one another and the cylinder walls, as described in U.S. Pat. No. 4,752,135; mixing element disks having mixing wings as described in U.S. Pat. Nos. 3,195,868 to Loomans et al. and 5,593,227 to Scheuring et al.; mixing elements having two opposing lobes wherein one lobe is tapered, as described in U.S. Pat. No.

6,116,770 to Kiani et al.; and the various mixing elements, including those characterized as prior art mixing elements, described in U.S. Pat. No. 5,932,159 to Rauwendaal.

In one embodiment, melt-blending to form a first intimate blend and melt-blending to form a second intimate blend collectively comprise mixing with a mixing energy input of at least about 0.20 kilowatt-hour/kilogram (kW-hr/kg). A mixing energy input of at least about 0.22 kW-hr/kg may be preferred, and an energy input of at least about 0.24 kW-hr/kg may be more preferred. Such quantitative mixing energy input may be determined by measuring the rotation rate of the extruder motor and the extruder motor's current draw. Since a direct current (DC) motor speed is directly proportional to the voltage applied, a previously measured proportionality constant may be used to convert the measured motor speed, in rpm, to a voltage in volts. The energy input may then be calculated as the product of the extruder motor current and voltage, divided by the extruder throughput rate. For example, an extruder operating at 120 volts, 2 amps, and a throughput of 1 kg/hr has an energy input of $$(120\ V)(2\ A)/(1\ kg/hr)=240\ W\text{-}hr/kg$$

or 0.240 kW-hr/kg.

In one embodiment, the first intimate blend may be formed and pelletized in one step, then mixed with the polyolefin to form the second intimate blend in another step.

Suitable temperatures for forming the composition are generally about 80° C. to about 400° C. Within this range it may be preferred to form the first intimate blend by exposing the first intimate blend components to a temperature of at least about 200° C., more preferably at least about 250° C., yet more preferably at least about 280° C. Also within the above range, it may be preferred to form the first intimate blend by exposing the first intimate blend components to a temperature of up to about 320° C., more preferably up to about 300° C., yet more preferably up to about 290° C. The same temperatures are also suitable for formation of the second intimate blend.

The method is suitable for preparing the poly(arylene ether)-polyolefin compositions on any scale, from grams to tons. For economical production of commercially significant amounts of the composition, it may preferred that the method have a throughput rate of at least about 10 kilograms per hour (kg/h), more preferably at least about 5,000 kg/h, based on the total weight of the composition. Throughput rates of 100,000 kg/h and higher may be used.

Any known apparatus may be used to carry out the method. Utilization of the method on a laboratory scale may employ a lab-scale mixer such as, for example, a Labo Plastomill available from Toyo Seiki Company, Hyogo, Japan. Preferred apparatuses for conducting the method on a larger scale include single-screw and twin-screw extruders, with twin-screw extruders being more preferred. Extruders for melt blending of thermoplastics are commercially available from, for example, Krupp Werner & Pfleiderer Corporation (now known as Coperion), Ramsey, N.J. The method may also be carried out using apparatus designed to compound the composition and mold it directly, without an intermediate pelletizing step. Such apparatus is described, for example, in U.S. Pat. No. 6,109,910 to Sekido, and U.S. Pat. No. 6,464,910 B1 to Smorgon et al; U.S. patent application Ser. No. 2003/0021860 A1 to Clock et al; and International Publication No. WO 02/43943 A1 to Adedeji et al.

The first intimate blend may comprise any conventional poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula:

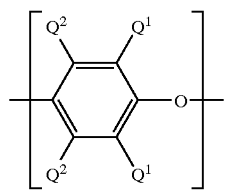

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1\text{-}4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per grain (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The first intimate blend may comprise poly(arylene ether) in an amount of about 10 to about 70 weight percent, based on the total weight of the composition. Within this range, it may be preferred to use at least about 18 weight percent of the poly(arylene ether). Also within this range, it may be preferred to use up to about 50 weight percent, more preferably up to about 40 weight percent, of the poly(arylene ether).

The first intimate blend further comprises a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

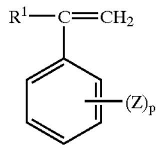

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, vinyltoluenes such as p-vinyltoluene, and the like. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier. Within these ranges it may be preferred to use at least 88 weight percent of the alkenyl aromatic monomer. It may also be preferred to use up to about 94 weight percent of the alkenyl aromatic monomer. It may also be preferred to use at least 6 weight percent of the rubber modifier. It may also be preferred to use up to 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Plastics, and BA 5350 from Chevron.

The first intimate blend may comprise the poly(alkenyl aromatic) resin in an amount of about 1 to about 46 weight percent, preferably about 3 to about 46 weight percent, based on the total weight of the composition.

Alternatively, the amount of poly(alkenyl aromatic) resin may be expressed as a fraction of the total of poly(arylene ether) and poly(alkenyl aromatic) resin based on the combined weight of poly(arylene ether) and poly(alkenyl aromatic) resin. The first intimate blend may comprise preferably comprise poly(alkenyl aromatic) resin in an amount of about 10 to about 80 weight percent, based on the combined weight of poly(arylene ether) and poly(alkenyl aromatic) resin. Within this range, it may be preferred to use at least about 20 weight percent, more preferably at least about 40 weight percent, of the poly(alkenyl aromatic) resin based on the total of the poly(arylene ether) and the poly(alkenyl aromatic) resin. Also within this range, it may be preferred to use up to about 70 weight percent, more preferably up to about 65 weight percent of the poly(alkenyl aromatic) resin based on the total of the poly(arylene ether) and the poly(alkenyl aromatic) resin. The proportions of poly(alkenyl aromatic) resin and poly(arylene ether) may be manipulated to control the glass transition temperature ($T_g$) of the single phase comprising these two components relative to the $T_g$ of the poly(arylene ether) alone, or relative to the melting temperature ($T_m$) of the polyolefin alone. For example, the relative amounts of poly(alkenyl aromatic) resin and poly(arylene ether) may be chosen so that the poly(arylene ether) and the poly(alkenyl aromatic) resin form a single phase having a glass transition temperature at least about 20° C. greater, preferably at least about 30° C. greater, than the glass transition temperature of the poly(alkenyl aromatic) resin alone, which may be, for example, about 100° C. to about 110° C. Also, the relative amounts of poly(alkenyl aromatic) resin and poly(arylene ether) may be chosen so that the poly(arylene ether) and the poly(alkenyl aromatic) resin form a single phase having a glass transition temperature up to about 15° C. greater, preferably up to about 10° C. greater, more preferably up to about 1° C. greater, than the $T_m$ of the polyolefin alone. The relative amounts of poly(alkenyl aromatic) resin and poly(arylene ether) may be chosen so that the poly(arylene ether) and the poly(alkenyl aromatic) resin form a single phase having a glass transition temperature of about 130° C. to about 180° C.

The first intimate blend further comprises a hydrogenated block copolymer of an alkenyl aromatic compound and a conjugated diene. The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having branched chains.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B diblock and A-B-A triblock structures being particularly preferred.

The alkenyl aromatic compound providing the block (A) is represented by formula:

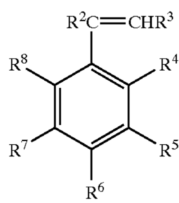

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the hydrogenated block copolymer. Suitable alkenyl aromatic content may be about 10 to about 90 weight percent based on the total weight of the hydrogenated block copolymer. Within this range, it may be preferred to have an alkenyl aromatic content of at least about 40 weight percent, more preferably at least about 50 weight percent, yet more preferably at least about 55 weight percent. Also within this range, it may be preferred to have an alkenyl aromatic content of up to about 85 weight percent, more preferably up to about 75 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight may preferably be at least about 10,000 AMU, more preferably at least about 30,000 AMU, yet more preferably at least about 45,000 AMU. Also within this range, the number average molecular weight may preferably be up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 200° C. or having no definite melting point (i.e., having non-crystallinity), as measured according to the above-described technique, are preferred. More preferably, the hydrogenated block copolymers have a melting point of at least about 0° C., yet more preferably at least about 20° C., still more preferably at least about 50° C.

The hydrogenated block copolymer may have any glass transition temperature ($T_g$) ascribed to the hydrogenated conjugated diene polymer chain. From the standpoint of low-temperature impact strength of the resulting resin composition, it preferably has a $T_g$ of up to about 0° C., more preferably up to about −120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, and G1652 available from Kraton Polymers (formerly a division of Shell Chemical Company), and TUFTEC® H1041, H1043, H1052, H1062, H1141, and H1272 available from Asahi Chemical. Preferred hydrogenated block copolymers include the highly hydrogenated styrene(ethylene-butylene)-styrene triblock copolymers commercially available as, for example, TUFTEC® H1043 from Asahi Chemical.

The first intimate blend may comprise the hydrogenated block copolymer in an amount of about 1 to about 20 weight percent, preferably about 1 to about 18 weight percent, more preferably about 1 to about 15 weight percent, based on the total weight of the composition.

The first intimate blend further comprises an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 80 weight percent (A) blocks.

Particularly preferred unhydrogenated block copolymers included styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical).

The unhydrogenated block copolymer may be used at about 1 to about 20 weight percent, preferably about 1 to about 15 weight percent, more preferably about 1 to about 10 weight percent, based on the total weight of the composition.

The method comprises melt blending the first intimate blend and a polyolefin to form a second intimate blend. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alphaolefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins are may comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The second intimate blend may comprise polyolefin in an amount of about 10 to about 80 weight percent, preferably about 10 to about 70 weight percent, more preferably about 10 to about 60 weight percent, based on the total weight of the composition.

Although the method comprises melt blending the first intimate blend with a polyolefin to form a second intimate blend, it is possible to add a portion of the polyolefin during formation of the first intimate blend. It is preferred that any polyolefin included in the first intimate blend be less than the amount of polyolefin blended with the first intimate blend during formation of the second intimate blend. It is preferred to add at least half of the total polyolefin during formation of the second intimate blend.

The first intimate blend may, optionally, further comprise a polypropylene-polystyrene copolymer that is a graft copolymer, a diblock copolymer, a multiblock copolymer, a radial block copolymer, or a combination comprising at least one of the foregoing polypropylene-polystyrene copolymers. Alternatively, the polypropylene-polystyrene copolymer may be added as a component of the second intimate blend. In a third alternative, about 1% to about 99% of the total polypropylene-polystyrene copolymer may be added as a component of the first intimate blend, with the remainder added as a component of the second intimate blend.

In a preferred embodiment, the polypropylene-polystyrene copolymer is a graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the polymerized ethylene content is up to about 10 weight percent, preferably up to about 4 weight percent, and when the olefin is a $C_4$–$C_{10}$ olefin, the polymerized content of the $C_4$–$C_{10}$ olefin is up to about 20 weight percent, preferably up to about 16 weight percent; (c) a random terpolymer of propylene and at least two olefins selected from the group consisting of ethylene and $C_4$–$C_{10}$ alpha-olefins, provided that the polymerized $C_4$–$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$–$C_{10}$ olefins include the linear and branched $C_4$–$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbomene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent, of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present, the polypropylene-polystyrene graft copolymer may be used in an amount of about 0.5 to about 30 weight percent, preferably about 0.5 to about 20 weight percent, more preferably about 0.5 to about 10 weight percent, based on the total weight of the composition.

The method may, optionally, further comprise the addition of an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent, preferably about 40 to about 60 weight percent, ethylene and about 75 to about 25 weight percent, preferably about 60 to about 40 weight percent, alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polypropylene as, for example, the ethylene-propylene rubber pre-dispersed in polypropylene sold as product numbers Profax 7624 and Profax 8023 from Basell, and the ethylene-butene rubber pre-dispersed in polypropylene sold as Catalloy K021P from Basell.

In a first embodiment, the ethylene/alpha-olefin elastomeric copolymer may be added during formation of the first intimate blend. In a second embodiment, the ethylene/alpha-olefin elastomeric copolymer may be added during formation of the second intimate blend. In a third embodiment, about 1 to about 99% of the ethylene/alpha-olefin elastomeric copolymer may be added during formation of the first intimate blend, with the remainder added during formation of the second intimate blend. In a fourth embodiment, the ethylene/alpha-olefin elastomeric copolymer may be prepared as a heterophasic copolymer with the polyolefin, and the resulting heterophasic copolymer comprising ethylene/alpha-olefin elastomeric copolymer and polyolefin may be added during formation of the first intimate blend, or, preferably, during formation of the second intimate blend.

When present, the ethylene/alpha-olefin elastomeric copolymer may be used in an amount of about 1 to about 20 weight percent, based on the total of the composition. Within this range, the ethylene/alpha-olefin elastomeric copolymer may preferably be used in an amount of at least about 3 weight percent. Also within this range, ethylene/alpha-olefin elastomeric copolymer may preferably be used in an amount up to about 15 weight percent.

In one embodiment, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 60 weight percent, preferably about 10 to about 40 weight percent, based on the combined weight of polyolefin and ethylene/alpha-olefin elastomeric copolymer.

The method may, optionally, comprise the addition of one or more reinforcing fillers. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, vapor-grown carbon fibers, and especially graphitic vapor-grown carbon fibers having average diameters of about 3 to about 500 nanometers (see, for example, U.S. Pat. Nos. 4,565,684 and 5,024,818 to Tibbetts et al., 4,572,813 to Arakawa; 4,663,230 and 5,165,909 to Tennent, 4,816,289 to Komatsu et al., 4,876,078 to Arakawa et al., 5,589,152 to Tennent et al., and 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), polyimide benzoxazole, poly(phenylene sulfide), polyesters, aromatic polyamides, aromatic polyimides or polyetherimides, acrylic resins, and poly(vinyl alcohol). Fluoropolymers such as polytetrafluoroethylene, may be used. Also included are natural organic fibers known to one skilled in the art, including cotton cloth, hemp cloth, and felt, carbon fiber fabrics, and natural cellulosic fabrics such as Kraft paper, cotton paper, and glass fiber containing paper. Such reinforcing fillers could be in the form of monofilament or multifilament fibers and could be used either alone or in combination with another type of fiber, through, for example, coweaving or core-sheath, side-by-side, orange-type or matrix and fibril constructions or by other methods known to one skilled in the art of fiber manufacture. They may be in the form of, for example, woven fibrous reinforcements, non-woven fibrous reinforcements, or papers.

Preferred reinforcing fillers include glass fibers. Preferred glass fibers may have diameters of about 2 to about 25 micrometers, more preferably about 10 to about 20 micrometers, yet more preferably about 13 to about 18 micrometers. The length of the glass fibers may be about 0.1 to about 20 millimeters, more preferably about 1 to about 10 millimeters, yet more preferably about 2 to about 8 millimeters. Glass fibers comprising a sizing to increase their compatibility with the polyolefin are particularly preferred. Suitable sizings are described, for example, in U.S. Pat. No. 5,998,029 to Adzima et al. Suitable glass fibers are commercially available as, for example, product numbers 147A-14P (14 micrometer diameter) and 147A-17P (17 micrometer diameter) from Owens Corning.

Preferred reinforcing fillers further include talc. There are no particular limitations on the physical characteristics of the talc. Preferred talcs may have an average particle size of about 0.5 to about 25 micrometers. Within this range, it may be preferred to use a talc having an average particle size up to about 10 micrometers, more preferably up to about 5 micrometers. For some uses of the composition, it may be preferred to employ a talc that is F.D.A. compliant (i.e., compliant with U.S. Food and Drug Administration regulations). Suitable talcs include, for example, the F.D.A. compliant talc having an average particle size of about 3.2 micrometers sold as CIMPACT® 610(C) from Luzenac.

The compatibility of the reinforcing filler and the polyolefin may be improved not just with sizings on the surface of the reinforcing fillers, but also by adding to the composition a graft copolymer comprising a polyolefin backbone and polar grafts formed from one or more cyclic anhydrides. Such materials include graft copolymers of polyolefins and $C_4$–$C_{12}$ cyclic anhydrides, such as, for example, those available from ExxonMobil under the tradename EXXELOR® and from DuPont under the tradename FUSABOND®M. Examples of suitable polyolefin-graft-cyclic anhydride copolymers are the polypropylene-graft-maleic anhydride materials supplied by ExxonMobil as EXXELOR® PO1020 and by DuPont as FUSABOND® M613-05. Suitable amounts of such materials may be readily determined and are generally about 0.1 to about 10 weight percent, based on the total weight of the composition. Within this range, a polyolefin-graft-cyclic anhydride copolymer amount of at least about 0.5 weight percent may be preferred. Also within this range, a polyolefin-graft-cyclic anhydride copolymer amount of up to about 5 weight percent may be preferred.

The one or more reinforcing fillers may be melt blended with the first intimate blend and the polyolefin during formation of the second intimate blend. Alternatively, the method may comprise an additional blending step in which the one or more reinforcing fillers are blended with the second intimate blend. In another alternative, it may be advantageous to add the reinforcing fillers, especially particulate fillers (i.e., those having an aspect ratio less than about 3), during formation of the first intimate blend.

The method may, optionally, comprise the addition of additives to the composition. Such additives may include, for example, stabilizers, mold release agents, processing aids, flame retardants, drip retardants, nucleating agents, UV blockers, dyes, pigments, particulate fillers (i.e., fillers having an aspect ratio less than about 3), antioxidants, anti-static agents, blowing agents, and the like. Such additives are well known in the art and appropriate amounts may be readily determined. There is no particular limitation on how or when the additives are added. For example, the additives may be added during formation of the first intimate blend. Alternatively, the additives may be added during formation of the second intimate blend. In another alternative, the additives may be added in a separate step following formation of the second intimate blend.

As the composition is defined as comprising multiple components, it will be understood that each component is chemically distinct, particularly in the instance that a single chemical compound may satisfy the definition of more than one component.

In a preferred embodiment, the method of preparing a thermoplastic composition, comprises: melt-blending to form an first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, and about 1 to about 20 weight percent of an unhydrogenated block copolymer of an alkenyl aromatic compound and a conjugated diene; and melt-blending to form a second intimate blend comprising the first intimate blend, and about 10 to about 60 weight percent of a polyolefin; wherein all weight percents are based on the total weight of the composition.

In another preferred embodiment, the method of preparing a thermoplastic composition, comprises: melt-blending to form an first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, and about 1 to about 20 weight percent of an unhydrogenated block copolymer of an alkenyl aromatic compound and a conjugated diene; and melt-blending to form a second intimate blend comprising the first intimate blend, about 10 to about 60 weight percent of a polyolefin, and about 1 to about 20 weight percent of an ethylene/alpha-olefin elastomeric copolymer; wherein all weight percents are based on the total weight of the composition.

In yet another preferred embodiment, the method of preparing a thermoplastic composition, comprises: melt-blending to form an first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, about 1 to about 20 weight percent of an unhydrogenated block copolymer of an alkenyl aromatic compound and a conjugated diene, and about 0.5 to about 30 weight percent of a polypropylene-polystyrene graft copolymer; and melt-blending to form a second intimate blend comprising the first intimate blend and about 10 to about 60 weight percent of a polyolefin; wherein all weight percents are based on the total weight of the composition.

In another preferred embodiment, the method of preparing a thermoplastic composition comprises: melt-blending to form an first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, and about 1 to about 20 weight percent of an unhydrogenated block copolymer of an alkenyl aromatic compound and a conjugated diene; and melt-blending to form a second intimate blend comprising the first intimate blend, about 10 to about 60 weight percent of a polyolefin, and about 1 to about 50 weight percent of a reinforcing filler; wherein all weight percents are based on the total weight of the composition.

In another preferred embodiment, the method of preparing a thermoplastic composition comprises: melt-blending to form an first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, and about 1 to about 20 weight percent of an unhydrogenated block copolymer of an alkenyl aromatic compound and a conjugated diene; and melt-blending to form a second intimate blend comprising the first intimate blend and about 10 to about 60 weight percent of a polyolefin; and melt-blending to form a third intimate blend comprising the second intimate blend; and about 1 to about 50 weight percent of a reinforcing filler; wherein all weight percents are based on the total weight of the composition.

Another embodiment is a method of preparing a thermoplastic composition, comprising: melt-blending a poly (arylene ether), a poly(alkenyl aromatic) resin, a hydrogenated block copolymer of an alkenyl aromatic compound and a conjugated diene, and an unhydrogenated block copolymer of an alkenyl aromatic compound and a conjugated diene to form a first intimate blend; and melt-blending a polyolefin, additional hydrogenated block copolymer, and, optionally, an ethylene/alpha-olefin elastomeric copolymer, with the first intimate blend to form a second intimate blend comprising the first intimate blend, the polyolefin, and the additional hydrogenated block copolymer. In this embodiment, the additional hydrogenated block copolymer added to form the second intimate blend may be the same or different form the hydrogenated block copolymer used to form the first intimate blend. For example, a styrene-(ethylene-butylene)-styrene block copolymer may be added as the hydrogenated block copolymer to form the form the first intimate blend, and more of the same styrene-(ethylene-butylene)-styrene block copolymer may be added as the additional hydrogenated block copolymer to form the second intimate blend. As another example, a styrene-(ethylene-butylene)-styrene block copolymer may be added as the hydrogenated block copolymer to form the form the first intimate blend, and a styrene-(ethylene-propylene)-styrene block copolymer may be added as the additional hydrogenated block copolymer to form the second intimate blend. In a preferred embodiment, the additional hydrogenated block copolymer used to form the second intimate blend is a styrene-(ethylene-butylene)-styrene triblock copolymer having a styrene content of about 50 to about 90 weight percent. The amount of the additional hydrogenated block copolymer is about 1 to about 20 weight percent, based on the total weight of the composition. Within this range, the additional hydrogenated block copolymer amount is preferably at least about 1.5 weight percent, more preferably at least 2 weight percent. Also within this range, the additional hydrogenated block copolymer amount is preferably up to about 15 weight percent, more preferably up to about 5 weight percent.

Another embodiment is a method of preparing a thermoplastic composition, comprising: melt-blending to form a first intimate blend comprising about 10 to about 59 weight percent of a poly(arylene ether), about 1 to about 46 weight percent of a poly(alkenyl aromatic) resin, about 1 to about 20 weight percent of a hydrogenated block copolymer of alkenyl aromatic compound and a conjugated diene, and about 1 to about 20 weight percent of an unhydrogenated block copolymer of an alkenyl aromatic compound and a conjugated diene; and melt-blending about 10 to about 60 weight percent of a polyolefin and about 1 to about 20 weight percent of additional hydrogenated block copolymer with the first intimate blend to form a second intimate blend comprising the first intimate blend, about 10 to about 60 weight percent of the polyolefin, and about 1 to about 20 weight percent of additional hydrogenated block copolymer; wherein all weight percents are based on the total weight of the composition.

Another embodiment is a method of preparing a thermoplastic composition, comprising: melt-blending to form a first intimate blend comprising about 10 to about 59 weight percent of a poly(arylene ether) comprising 2,6-dimethyl-1,4-phenylene ether units, 2,3,6-trimethyl-1,4-phenylene ether units, or a combination thereof; about 1 to about 46 weight percent of polystyrene or rubber-modified polystyrene; about 1 to about 20 weight percent of a styrene-(ethylene-butylene)-styrene block copolymer having a styrene content of about 50 to about 90 weight percent; and about 1 to about 20 weight percent of a styrene-butadiene-styrene block copolymer; and melt-blending about 10 to about 60 weight percent of polypropylene and about 1 to about 20 weight percent of additional styrene-(ethylene-butylene)-styrene block copolymer having a styrene content of about 50 to about 90 weight percent with the first intimate blend to form a second intimate blend comprising the first intimate blend, about 10 to about 60 weight percent of the polypropylene, and about 1 to about 20 weight percent of additional styrene-(ethylene-butylene)-styrene block copolymer having a styrene content of about 50 to about 90 weight percent; wherein all weight percents are based on the total weight of the composition.

Another embodiment is a thermoplastic composition prepared according to any of the above-described methods.

While the method has been described in terms of poly(arylene ether)-polyolefin blends, it is generally applicable to a wide variety of thermoplastic blends in which a stiffer (e.g., higher flexural modulus) polymer is to be dispersed in the matrix of a less stiff (e.g., lower flexural modulus) polymer to produce blends having consistently reproducible properties. Furthermore, while the method has been described in terms of upstream and downstream addition of components during a single extruder pass, the first and second intimate blends may be formed in separate passes. For example, the a poly(arylene ether), poly(alkenyl aromatic) resin, hydrogenated block copolymer, and unhydrogenated block copolymer may be added to an extruder to form a first intimate blend which is extruded into strands and pelletized. This pelletized first intimate blend may then be added to an extruder in a second pass, with downstream addition of the polyolefin, additional hydrogenated block copolymer, and optional rubber and/or filler and/or additives, to form the second intimate blend.

The method is particularly useful for thermoplastic blends comprising at least three components, where the first component is intended to form the matrix phase of the final blend, the second component is intended to be a dispersed phase, and the third component is intended to reside at least partially at the interface of the matrix phase and the dispersed phase. Thus, the method may comprise: melt-blending to form a first intimate blend comprising a dispersed phase component and an interfacial component; and melt-blending to form a second intimate blend comprising the first intimate blend and a matrix component.

The invention is further illustrated by the following non-limiting examples.

EXAMPLES 1–3

Comparative Examples 1, 2

A single formulation was compounded by various methods in a twin screw extruder. The components and amounts of the formulation are summarized in Table 1.

TABLE 1

| material abbreviation | description | weight percent |
|---|---|---|
| PP | polypropylene, obtained as PH280 from Montell Polyolefin Inc. | 57.2 |
| EPR | ethylene propylene rubber, obtained as VISTALON ® 878 from ExxonMobil Chemical | 7.3 |
| PP-g-PS | polypropylene-polystyrene graft copolymer, obtained as Interloy PH 1045H1 from Montell Polyolefin Inc. | 13.3 |
| SEBS G1652 | styrene-(ethylene-butadiene)-styrene copolymer, obtained as KRATON ® G1652 from Kraton Polymers | 2.7 |
| PPE | poly(2,6-dimethylphenylene ether), IV = 0.40 dl/g, obtained from General Electric Company | 6.7 |
| SBS | styrene-butadiene-styrene block copolymer, obtained as KRATON ® D1101 from Kraton Polymers | 5.1 |
| xPS | homopolystyrene, also known as crystal polystyrene, obtained as PP-738 from Huntsman Chemical, MFI = 10.5 g/10 min at 200 C., 5 kg | 7.7 |

General Blending/Compounding Procedure: Using quantities specified in Table 1, PP-g-PS, PPE, xPS, HIPS, SEBS and SBS were hand mixed in a bag. The resulting mixture was subsequently mixed aggressively with a mechanical blender for uniformity. The uniform mixture was subsequently fed through a feeder and entered into an extruder at the extruder initial entry point. When the quantity of the poly(alkenyl aromatic) resin is equal to or greater than 10% of the total blend weight, the poly(alkenyl aromatic) resin may be fed thorough a separate upstream feeder. Components PP and EPR, in quantities specified in Table 1, were fed either upstream or downstream. Downstream addition corresponded to addition at barrel 6 of a 10-barrel extruder.

General Extrusion: a 30 millimeter co-rotating twin-screw extruder was used. Blends were melt extruded at 520° F., 450–500 rpm, and a throughput rate of 30–50 pounds per hour. Melt from the extruder was forced through a three-hole die to produce melt strands. These strands were rapidly cooled by passing them through a cold-water bath. The cooled strands were chopped into pellets. Pellets were dried in an oven at 200° F. for 2–4 hours.

General Molding: ASTM parts were molded on a 120 tonne molding machine (manufacturer Van Dorn) at 450–550° F. barrel temperature and 100–120° F. mold temperature.

Parts were tested according to ASTM methods. Izod notched impact was measured at 23° C. and −30° C. according to ASTM D256. Dynatup (falling dart) total energy and energy to failure were measured at 23° C. and −30° C. and at 5 and 7.5 mph according to ASTM D3763. Heat distortion temperature (HDT) was measured at 66 psi and 264 psi on ⅛ inch samples according to ASTM D648. Flexural modulus and flexural strength were measured at 23° C. on ⅛ inch samples according to ASTM D790. Tensile strength and tensile elongation at break were measured at 23° C. according to ASTM D638. Where presented, standard deviations reflect measurements on five samples.

Process variations included the extruder's barrel temperature, the screw rotation rate ("RPM"), the throughput rate, the fraction of polyolefin added upstream (i.e., during formation of the first intimate blend) versus downstream (i.e., during formation of the second intimate blend), and the fraction of SEBS and PP-g-PS added upstream versus downstream. For all formulations, formation of the first intimate blend utilized high intensity mixing abbreviated as "+1" and corresponding to the use of 6 mixing elements on each screw shaft, and formation of the second intimate blend utilized low intensity mixing abbreviated as "−1" and corresponding to the use of 5 mixing elements on each screw shaft. Also, for all for examples and comparative examples, PPE, xPS, and SBS, were added upstream, and EPR was added downstream. Examples differed from Comparative Examples in that Examples utilized downstream addition of all PP, whereas Comparative Examples utilized addition of 75% PP upstream and 25% PP downstream. Process variations and resulting properties are summarized in Table 2. Standard deviations reflect measurements on five samples. The best overall property balance was exhibited by Example 1, which utilized downstream addition of PP, and upstream addition of PP-g-PS and SEBS.

TABLE 2

| | Ex. 1 | Ex. 2 | Ex. 3 | Comp. Ex. 1 | Comp. Ex. 2 |
|---|---|---|---|---|---|
| PROCESS VARIATIONS | | | | | |
| upstream mixing | +1 | +1 | +1 | +1 | +1 |
| downstream mixing | +1 | +1 | +1 | +1 | +1 |
| RPM | 450 | 450 | 450 | 250 | 250 |
| Throughput Rate (lb/h) | 55 | 25 | 55 | 55 | 25 |
| Barrel Temp (° C.) | 240 | 240 | 290 | 290 | 240 |
| fraction PP added Upstream (%) | 0 | 0 | 0 | 75 | 75 |
| fraction (PP-g-PS + SEBS) added upstream (%) | 100 | 0 | 0 | 0 | 0 |
| PROPERTIES | | | | | |
| Notched Izod, 23° C. (ft-lb/in) | 7.219 | 2.742 | 2.961 | 3.309 | 4.400 |
| std dev (ft-lb/in) | 0.391 | 0.091 | 0.195 | 0.103 | 0.186 |
| rel std dev (%) | 5.4 | 3.3 | 6.6 | 3.1 | 4.2 |
| Notched Izod, −30° C. (ft-lb/in) | 1.385 | 0.723 | 0.851 | 1.183 | 1.257 |
| dev (ft-lb/in) | 0.053 | 0.071 | 0.144 | 0.172 | 0.109 |
| rel std dev (%) | 3.8 | 9.8 | 16.9 | 14.5 | 8.7 |
| Dynatup Total Energy, 5 mph, 23° C. (ft-lb) | 26.23 | 16.98 | 22.03 | 24.77 | 22.27 |
| std dev (ft-lb) | 0.34 | 5.06 | 3.12 | 1.54 | 4.55 |
| rel std dev (%) | 1.3 | 29.8 | 14.2 | 6.2 | 20.4 |
| Dynatup Total Energy, 5 mph, −30° C. (ft-lb) | 13.51 | 0.9 | 3.66 | 12.11 | 3.19 |
| std dev (ft-lb) | 2.09 | 0.47 | 2.38 | 1.53 | 0.81 |
| rel std dev (%) | 15.5 | 52.2 | 65.0 | 12.6 | 25.4 |
| Flexural Modulus, 23° C., ⅛ in (psi) | 186,300 | 202,700 | 200,600 | 207,400 | 199,100 |
| std dev (ft-lb) | 4848 | 2743 | 2823 | 2834 | 4825 |
| rel std dev (%) | 2.6 | 1.4 | 1.4 | 1.4 | 2.4 |

EXAMPLES 4–10

Using the same formulation as above, samples were compounded with process variations including the intensities of upstream and downstream mixing, the extruder barrel temperature, the screw rotation rate ("RPM"), and the throughput rate. For all samples, PPE, xPS, SBS, SEBS, and PP-g-PS were added upstream, and PP and EPR were added downstream. Results are presented in Table 3.

TABLE 3

| | Ex. 4 | Ex. 5 | Ex. 6 | Ex. 7 | Ex. 8 | Ex. 9 | Ex. 10 |
|---|---|---|---|---|---|---|---|
| PROCESS VARIATIONS | | | | | | | |
| upstream mixing | −1 | −1 | −1 | +1 | +1 | +1 | +1 |
| downstream mixing | −1 | +1 | +1 | −1 | +1 | +1 | +1 |
| RPM | 450 | 350 | 350 | 450 | 450 | 450 | 450 |
| Throughput Rate (kg/h) | 40 | 55 | 55 | 55 | 55 | 25 | 25 |
| Barrel Temperature (° C.) | 290 | 240 | 240 | 240 | 290 | 290 | 240 |
| PROPERTIES | | | | | | | |
| HDT, 66 psi, ⅛ in (° F.) | 221.7 | 211.1 | 207.9 | 206.4 | 219.8 | 216.0 | 215.8 |
| HDT, 264 psi, ⅛ in (° F.) | 143.6 | 144.0 | 141.1 | 139.1 | 144.1 | 141.5 | 142.3 |
| Notched Izod, 23° C. (ft-lb/in) | 2.373 | 3.804 | 4.444 | 7.219 | 2.273 | 1.567 | 2.667 |
| std dev (fl-lb/in) | 0.104 | 0.200 | 0.079 | 0.391 | 0.077 | 0.081 | 0.101 |
| rel std dev (%) | 4.4 | 5.3 | 1.8 | 5.4 | 3.4 | 5.2 | 3.8 |
| Notched Izod, −30° C. (ft-lb/in) | 0.896 | 1.273 | 1.037 | 1.385 | 0.827 | 0.638 | 0.933 |
| std dev (ft-lb/in) | 0.088 | 0.077 | 0.026 | 0.053 | 0.194 | 0.030 | 0.055 |
| rel std dev (%) | 9.8 | 6.0 | 2.5 | 3.8 | 23.5 | 4.7 | 5.9 |
| Dynatup Total Energy, 23° C., 7.5 mph (ft-lb) | 10.34 | 15.10 | 16.66 | 27.84 | 19.79 | 13.65 | 24.88 |
| std dev (ft-lb) | 2.63 | 1.07 | 1.13 | 0.39 | 6.16 | 4.81 | 0.98 |
| rel std dev (%) | 25.4 | 7.1 | 6.8 | 1.4 | 31.1 | 35.2 | 3.9 |
| Dynatup Total Energy, 23° C., 5 mph (ft-lb) | 12.32 | 14.22 | 16.93 | 26.23 | 14.57 | 8.56 | 18.67 |
| std dev (ft-lb) | 5.59 | 2.54 | 0.62 | 0.34 | 6.26 | 3.62 | 5.14 |
| rel std dev (%) | 45.4 | 17.9 | 3.7 | 1.3 | 43.0 | 42.3 | 27.5 |
| Dynatup Total Energy, −30° C., 5 mph (ft-lb) | 1.38 | 1.67 | 1.09 | 13.51 | 2.28 | 1.31 | 6.27 |
| std dev (ft-lb) | 0.67 | 0.40 | 0.23 | 2.09 | 2.01 | 0.36 | 1.98 |
| rel std dev (%) | 48.6 | 24.0 | 21.1 | 15.5 | 88.2 | 27.5 | 31.6 |
| Flexural Modulus, 23° C., ⅛ in (psi) | 202,400 | 192,400 | 185,700 | 186,300 | 198,800 | 193,500 | 198,200 |

TABLE 3-continued

| | Ex. 4 | Ex. 5 | Ex. 6 | Ex. 7 | Ex. 8 | Ex. 9 | Ex. 10 |
|---|---|---|---|---|---|---|---|
| std dev (psi) | 5235 | 2846 | 4341 | 4848 | 853 | 1767 | 1085 |
| rel std dev (%) | 2.6 | 1.5 | 2.3 | 2.6 | 0.4 | 0.9 | 0.5 |
| Tensile Elongation at break, 23° C. (%) | 56.2 | 69.0 | 61.1 | 100.6 | 66.5 | 61.9 | 55.8 |

EXAMPLE 11

A composition was compounded using the formulation detailed in Table 4. SEBS H1043 is a hydrogenated styrene-butadiene-styrene triblock copolymer having 66 weight percent polystyrene and obtained in pellet form as TUFTEC® H1043 from Asahi Chemical. All component amounts are expressed in parts by weight. Upstream mixing employed six mixing elements on each screw shaft; downstream mixing employed three mixing elements on each screw shaft. Except for EPR and 75% of the PP, which were added downstream, all components were added upstream to the extruder. The extruder barrel temperature was 288° F., and the screw rotation rate was 450 RPM. Properties were measured as discussed above, and results are given in Table 4.

TABLE 4

| | Ex. 11 |
|---|---|
| COMPOSITION | |
| PP | 33.90 |
| EPR | 6.20 |
| PP-g-PS | 5.90 |
| SBS | 11.40 |
| SEBS H1043 | 6.30 |
| xPS | 20.20 |
| PPE | 16.20 |
| PROPERTIES | |
| Flex Modulus, 23° C., ⅛" (psi) | 221,000 |
| Flex Strength at Yield (psi) | 7300 |
| HDT, 66 psi, ⅛" (° F.) | 229 |
| HDT, 264 psi, ⅛" (° F.) | 170 |
| Notched Izod, 23° C. (ft-lb/in) | 8.9 |
| Notched Izod, −30° C. (ft-lb/in) | 2.5 |
| Unnotched Izod, 23° C. (ft-lb/in) | — |
| Energy to Fail, 23° C., 7.5 mph (ft-lb) | 19.2 |
| Total Energy, 23° C., 7.5 mph (ft-lb) | 32.4 |
| Energy to Fail, −30° C., 7.5 mph (ft-lb) | 14.7 |
| Total Energy, −30° C., 7.5 mph (ft-lb) | 17 |
| Energy to Fail, −30° C., 5 mph (ft-lb) | — |
| Total Energy, −30° C., 5 mph (ft-lb) | — |
| Tensile strength at yield (psi) | 5,060 |
| Tensile Stress at break (psi) | 5,079 |
| Tensile Elongation at break (%) | 273 |

EXAMPLES 12–47

These examples collectively illustrate the effect of mixing energy input on properties of a single composition.

The composition is summarized in Table 5; all amounts are in units of weight percent, based on the total composition. Components were as specified in Table 1, except that EPR was obtained as PROFAX 7624 from Montell Polyolefins, which is a heterophasic/pre-dispersed blend of about 20 weight percent EPR in polypropylene; polypropylene (PP) was a combination of PD403 obtained from Montell Polyolefin and the 80 weight percent polypropylene content of PROFAX 7624.

TABLE 5

| | |
|---|---|
| PPE | 16.14 |
| SBS | 11.36 |
| xPS | 20.13 |
| SEBS H1043 | 6.28 |
| PP-g-PS | 5.88 |
| PP | 33.76 |
| EPR | 6.20 |
| thermal stabilizers | 0.25 |

Compositions were extruded using upstream additions of all components except for EPR and PP, which were added downstream. The barrel temperature was 500° F. for all samples. Mixing energy input was varied by changing the number of downstream mixing elements in the extruder and by changing the extruder screw speed and the total feed rate of all components. The energy input for each example was calculated according to the formula $$E=V*A/T$$

where E is the energy input (in kW-hr/kg), V is the voltage applied to the DC extruder motor (in volts), A is the current drawn by the extruder motor (in amps), and T is the material throughput (in grams).

ASTM parts were molded as described above, and values of Energy to Failure at −30° C., 5 mph, were measured according to ASTM D3763. The results, presented in Table 6, indicate a significant correlation between higher downstream energy input and higher values of Energy to Failure.

TABLE 6

| Ex. No. | Energy Input (kW-hr/kg) | Energy to Failure at −30° C., 5 mph (ft-lb) |
|---|---|---|
| 12 | 0.228 | 11.83 |
| 13 | 0.241 | 15.23 |
| 14 | 0.218 | 11.61 |
| 15 | 0.234 | 11.32 |
| 16 | 0.229 | 5.87 |
| 17 | 0.224 | 10.32 |
| 18 | 0.211 | 8.99 |
| 19 | 0.227 | 10.52 |
| 20 | 0.215 | 12.41 |
| 21 | 0.247 | 19.36 |
| 22 | 0.233 | 6.74 |
| 23 | 0.216 | 10.72 |
| 24 | 0.227 | 13.46 |
| 25 | 0.251 | 14.80 |
| 26 | 0.224 | 11.03 |
| 27 | 0.226 | 10.10 |
| 28 | 0.225 | 5.80 |
| 29 | 0.243 | 18.11 |
| 30 | 0.246 | 13.30 |
| 31 | 0.230 | 11.10 |
| 32 | 0.241 | 16.94 |
| 33 | 0.223 | 6.74 |
| 34 | 0.233 | 9.54 |
| 35 | 0.222 | 3.79 |
| 36 | 0.224 | 7.74 |

TABLE 6-continued

| Ex. No. | Energy Input (kW-hr/kg) | Energy to Failure at −30° C., 5 mph (ft-lb) |
|---|---|---|
| 37 | 0.267 | 21.74 |
| 38 | 0.255 | 21.16 |
| 39 | 0.245 | 20.29 |
| 40 | 0.240 | 20.06 |
| 41 | 0.267 | 14.88 |
| 42 | 0.245 | 13.29 |
| 43 | 0.245 | 23.24 |
| 44 | 0.245 | 21.71 |
| 45 | 0.245 | 21.41 |
| 46 | 0.245 | 23.47 |
| 47 | 0.245 | 22.28 |

EXAMPLES 48–59

These examples further illustrate the effects on properties of downstream versus upstream addition of polyolefin, intensity of upstream kneading, and intensity of downstream kneading.

The composition is detailed in Table 5, above. Process variables were downstream vs. upstream addition of PP and EPR, high (+1) vs. low (−1) intensity upstream kneading, and high (+1) vs. low (−1) intensity downstream kneading. High intensity upstream and downstream kneading corresponded to use of assemblies of multiple right-handed, left-handed, and neutral kneading elements as depicted in FIG. 1 as Kneading 1 (+1) and Kneading 2 (+1), respectively. Likewise, low intensity upstream and downstream kneading corresponded to the use of assemblies depicted in FIG. 1 as Kneading 1 (−1) and Kneading 2 (−1), respectively. In the screw elements labeled in FIG. 1, RSE stands for right-handed screw element, SFE stands for single flighted element, RKB stands for right-handed kneading block, NKB stands for neutral kneading block, and LKB stands for left-handed kneading block. Each labeled element includes a two-number or three-number designation following the three letter acronyms described above. For conveying elements (i.e., those elements for which the third letter of the three letter acronym is "E"), the first number is the pitch (i.e., the axial length in millimeters required for a flight to make a full revolution). For kneading blocks (i.e., those elements for which the third letter of the three letter acronym is "B"), the first number is the offset angle of each individual disk to its neighbor, and the second number is the total number of disks that make up the screw element. For all screw elements, the last number is the total length of the screw element in millimeters. The numbered sections above the screw elements are known as barrel numbers. Each kneading section is bounded by the first and last kneading blocks within that section. For example, "Kneading 1+1" is bounded on the left by RKB 45/5/28 and on the right by LKB 45/5/14. It will be understood that the lower half of the figure is meant to show the "opposite" versions of Kneading 1 and Kneading 2 that may be inserted into the corresponding kneading sections in the upper half of the figure.

Process variations and property values are presented in Table 7. A comparison of Examples 52 and 53 versus 54 and 55 illustrates the effect of upstream versus downstream addition of polyolefin, respectively, for high intensity upstream mixing and low intensity downstream mixing. Note that Examples 54 and 55, with downstream addition of polyolefin, exhibit superior Notched Izod impact strength at 23° C., Energy to Failure at −30° C., Total Energy at −30° C., Flexural Strength at Yield, and Tensile Strength at Yield compared to Examples 52 and 53 with upstream addition of polyolefin.

A comparison of Examples 54 and 55 versus 56 and 57 illustrates the effect of low versus high intensity downstream kneading, respectively, for downstream addition of PP and EPR and high intensity upstream mixing. Note that Examples 54 and 55, with low intensity downstream kneading, exhibit superior Notched Izod impact strength at 23° C. and −30° C. compared to Examples 56 and 57 with high intensity downstream kneading.

TABLE 7

| | Ex. 48 | Ex. 49 | Ex. 50 | Ex. 51 | Ex. 52 | Ex. 53 |
|---|---|---|---|---|---|---|
| PROCESS VARIATIONS | | | | | | |
| % (PP + EPR) added downstream | 0 | 0 | 100 | 100 | 0 | 0 |
| upstream mixing | −1 | −1 | −1 | −1 | +1 | +1 |
| downstream mixing | −1 | −1 | −1 | −1 | −1 | −1 |
| PROPERTIES | | | | | | |
| HDT, 66 psi, ⅛ in (° F.) | 223.7 | 225.1 | 227.9 | 228.3 | — | 230.4 |
| std dev (° F.) | 9.1 | 5.7 | 0.6 | 2.3 | — | 1.9 |
| HDT, 264 psi, ⅛ in (° F.) | 163.2 | 166.6 | 164.4 | 164.6 | 165.6 | 166.7 |
| std dev (° F.) | 0.9 | 2.4 | 0.6 | 2.4 | 1.3 | 1.4 |
| Notched Izod, 23° C. (ft-lb/in) | 8.1 | 8.2 | 7.8 | 8.8 | 7.8 | 7.6 |
| std dev (ft-lb/in) | 0.1 | 0.3 | 0.3 | 0.4 | 0.3 | 0.2 |
| Notched Izod, −30° C. (ft-lb/in) | 2.3 | 2.9 | 2.6 | 2.6 | 2.4 | 3.0 |
| std dev (ft-lb/in) | 0.4 | 0.8 | 0.5 | 0.3 | 0.3 | 0.7 |
| Dynatup Energy to Failure, 23° C., 7.5 mph (ft-lb) | 17.55 | 17.61 | 17.61 | 17.74 | 17.90 | 17.98 |
| std dev (ft-lb) | 0.46 | 0.24 | 0.59 | 0.54 | 0.23 | 0.51 |
| Dynatup Total Energy, 23° C., 7.5 mph (ft-lb) | 28.57 | 26.69 | 25.38 | 27.02 | 29.16 | 30.39 |
| std dev (ft-lb) | 1.78 | 2.97 | 3.19 | 2.64 | 2.44 | 1.03 |
| Dynatup Energy to Failure, −30° C., 7.5 mph (ft-lb) | 11.13 | 7.83 | 6.41 | 8.22 | 10.03 | 10.73 |
| std dev (ft-lb) | 4.17 | 3.42 | 2.30 | 4.42 | 5.26 | 5.40 |
| Dynatup Total Energy, −30° C., 7.5 mph (ft-lb) | 12.51 | 8.32 | 7.08 | 8.64 | 10.52 | 11.22 |

TABLE 7-continued

| | | | | | | |
|---|---|---|---|---|---|---|
| std dev (ft-lb) | 5.67 | 3.43 | 2.68 | 4.54 | 5.42 | 5.55 |
| Dynatup Energy to Failure, −30° C., 5 mph (ft-lb) | 15.04 | 15.11 | 9.82 | 10.14 | 17.87 | 17.93 |
| std dev (ft-lb) | 4.11 | 5.46 | 3.97 | 4.63 | 3.08 | 4.35 |
| Dynatup Total Energy, −30° C., 5 mph (ft-lb) | 15.50 | 15.54 | 10.16 | 10.49 | 19.06 | 19.69 |
| std dev (ft-lb) | 4.23 | 5.58 | 4.04 | 4.74 | 4.13 | 6.52 |
| Flexural Modulus, 23° C., ⅛ in (psi) | 203,900 | 210,300 | 209,800 | 214,000 | 213,100 | 212,200 |
| std dev (psi) | 980 | 755 | 3936 | 2612 | 3368 | 1532 |
| Flexural Strength at Yield, 23° C., ⅛ in (psi) | 6,704 | 6,830 | 6,878 | 6,994 | 6,888 | 6,875 |
| std dev (psi) | 21 | 17 | 32 | 32 | 22 | 23 |
| Tensile Strength at Yield, 23° C., ⅛ in (psi) | 4,693 | 4,721 | 4,809 | 4,818 | 4,703 | 4,693 |
| std dev (psi) | 27.4 | 5.8 | 19.4 | 10.8 | 6.0 | 27.3 |
| Tensile Strength at Break, 23° C., ⅛ in (psi) | 4,216 | 4,454 | 4,358 | 4,508 | 4,588 | 4,216 |
| std dev (psi) | 182.6 | 105.3 | 89.8 | 108.8 | 32.4 | 182.6 |
| Tensile Elongation at break, 23° C. (%) | 137.42 | 203.69 | 171.06 | 205.44 | 248.66 | 137.6 |
| std dev (%) | 64.02 | 30.87 | 19.52 | 32.55 | 10.74 | 64.07 |

| | Ex. 54 | Ex. 55 | Ex. 56 | Ex. 57 | Ex. 58 | Ex. 59 |
|---|---|---|---|---|---|---|
| PROCESS VARIATIONS | | | | | | |
| % (PP + EPR) added downstream | 100 | 100 | 100 | 100 | 0 | 0 |
| upstream mixing | +1 | +1 | +1 | +1 | +1 | +1 |
| downstream mixing | −1 | −1 | +1 | +1 | +1 | +1 |
| PROPERTIES | | | | | | |
| HDT, 66 psi, ⅛ in (° F.) | 225.5 | 230.4 | 238.1 | 233.6 | 235.4 | 234.6 |
| std dev (° F.) | 8.1 | 0.9 | 0.8 | 1.9 | 2.3 | 3.0 |
| HDT, 264 psi, ⅛ in (° F.) | 165.5 | 168.7 | 171.4 | 170.3 | 169.7 | 169.0 |
| std dev (° F.) | 1.7 | 0.9 | 2.3 | 0.8 | 0.8 | 2.6 |
| Notched Izod, 23° C. (ft-lb/in) | 8.4 | 8.5 | 7.5 | 7.8 | 7.2 | 7.5 |
| std dev (ft-lb/in) | 0.4 | 0.2 | 0.3 | 0.4 | 0.2 | 0.3 |
| Notched Izod, −30° C. (ft-lb/in) | 2.7 | 2.7 | 2.2 | 2.1 | 2.1 | 2.1 |
| std dev (ft-lb/in) | 0.3 | 0.3 | 0.2 | 0.1 | 0.2 | 0.2 |
| Dynatup Energy to Failure, 23° C., 7.5 mph (ft-lb) | 17.77 | 17.75 | 17.52 | 17.5 | 16.83 | 17.52 |
| std dev (ft-lb) | 0.40 | 0.17 | 0.5 | 0.52 | 0.28 | 0.13 |
| Dynatup Total Energy, 23° C., 7.5 mph (ft-lb) | 28.84 | 29.89 | 28.07 | 27.07 | 25.59 | 28.47 |
| std dev (ft-lb) | 3.20 | 1.57 | 1.13 | 3.22 | 2.56 | 1.41 |
| Dynatup Energy to Failure, −30° C., 7.5 mph (ft-lb) | 15.62 | 15.83 | 17.18 | 16.61 | 13.39 | 16.56 |
| std dev (ft-lb) | 5.38 | 6.89 | 6.80 | 6.12 | 7.66 | 5.44 |
| Dynatup Total Energy, −30° C., 7.5 mph (ft-lb) | 17.88 | 20.65 | 18.26 | 19.21 | 14.45 | 18.05 |
| std dev (ft-lb) | 7.80 | 12.27 | 7.37 | 8.76 | 8.49 | 6.66 |
| Dynatup Energy to Failure, −30° C., 5 mph (ft-lb) | 17.09 | 20.81 | 15.17 | 18.22 | 12.13 | 16.05 |
| std dev (ft-lb) | 6.56 | 3.49 | 6.13 | 3.80 | 6.45 | 6.95 |
| Dynatup Total Energy, −30° C., 5 mph (ft-lb) | 20.63 | 27.63 | 17.73 | 19.85 | 13.33 | 18.84 |
| std dev (ft-lb) | 9.48 | 8.10 | 9.08 | 5.06 | 8.09 | 9.37 |
| Flexural Modulus, 23° C., ⅛ in (psi) | 215,700 | 218,400 | 225,100 | 220,400 | 220,900 | 220,600 |
| std dev (psi) | 997 | 2,298 | 2,172 | 1,398 | 1,373 | 728 |
| Flexural Strength at Yield, 23° C., ⅛ in (psi) | 7,052 | 7,098 | 7,307 | 7,195 | 7,075 | 7,099 |
| std dev (psi) | 23 | 35 | 35 | 44 | 29 | 50 |
| Tensile Strength at Yield, 23° C., ⅛ in (psi) | 4,826 | 4,867 | 4,936 | 4,910 | 4,824 | 4,814 |
| std dev (psi) | 13.0 | 11.4 | 25.8 | 19.4 | 19.7 | 32.5 |
| Tensile Strength at Break, 23° C., ⅛ in (psi) | 4,541 | 4,472 | 4,601 | 4,665 | 4,607 | 4,575 |
| std dev (psi) | 67.4 | 105.8 | 88.7 | 62.0 | 60.2 | 153.4 |
| Tensile Elongation at break, 23° C. (%) | 215.86 | 212.81 | 196.47 | 232.73 | 216.67 | 206.02 |
| std dev (%) | 26.76 | 33.25 | 33.81 | 9.92 | 18.80 | 80.46 |

EXAMPLE 60

Poly(2,6-dimethyl-1,4-phenylene ether) (16.2 weight percent, IV=0.40 dL/g), homopolystyrene (20.2 weight percent), styrene-(ethylene-butylene)-styrene copolymer (3.15 weight percent), and styrene-butadiene-styrene triblock copolymer (11.40 weight percent), and polypropylene-graft-polystyrene copolymer (5.90 weight percent) are had mixed in a bag and fed upstream to an extruder as described for Examples 1–3. Polypropylene (33.90 weight percent), ethylene-propylene rubber (6.20 weight percent), and additional styrene-(ethylene-butylene)-styrene copolymer (3.15 weight percent) are pre-mixed and fed downstream at barrel 6 of the 10-barrel extruder. The resulting composition is forced through a three-hole die to produce melt strands, which are cooled and chopped into pellets.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

We claim:

1. A method of preparing a thermoplastic composition, comprising:

melt-blending
- a poly(arylene ether),
- a poly(alkenyl aromatic) resin,
- a hydrogenated block copolymer of an alkenyl aromatic compound and a conjugated diene, and
- an unhydrogenated block copolymer of an alkenyl aromatic compound and a conjugated diene to form a first intimate blend; and melt-blending a polyolefin and additional hydrogenated block copolymer with the first intimate blend to form a second intimate blend comprising
- the first intimate blend,
- the polyolefin, and
- the additional hydrogenated block copolymer.

2. The method of claim 1, wherein melt-blending to form a first intimate blend comprises heating to a temperature of about 80° C. to about 400° C.

3. The method of claim 1, wherein the melt-blending to form a first intimate blend comprises mixing with at least two mixing elements.

4. The method of claim 1, wherein melt-blending to form a first intimate blend and melt-blending to form a second intimate blend collectively comprise mixing with a mixing energy input of at least about 0.20 kW-hr/kg.

5. The method of claim 1, wherein the first intimate blend further comprises a polyolefin in an amount not greater than that of the polyolefin added during formation of the second intimate blend.

6. The method of claim 1, wherein the poly(arylene ether) comprises a plurality of structural units of the formula:

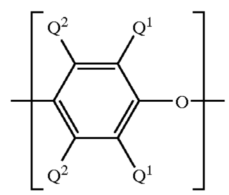

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms.

7. The method of claim 2, wherein each $Q^1$ is independently $C_1$–$C_4$ alkyl or phenyl, and each $Q^2$ is independently hydrogen or methyl.

8. The method of claim 1, wherein the poly(arylene ether) has an intrinsic viscosity of about 0.2 to about 0.6 dL/g as measured in chloroform at 25° C.

9. The method of claim 1, wherein the poly(arylene ether) comprises a copolymer of 2,6-dimethylphenol and 2,3,6-trimethylphenol.

10. The method of claim 1, wherein the first intimate blend comprises the poly(arylene ether) in an amount of about 10 to about 59 weight percent, based on the total weight of the composition.

11. The method of claim 1, wherein the poly(alkenyl aromatic) resin comprises at least 25% by weight of structural units derived from an alkenyl aromatic monomer of the formula

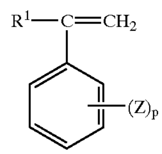

wherein $R^1$ is hydrogen, $C_1$–$C_8$ alkyl, or halogen; Z is vinyl, halogen, or $C_1$–$C_8$ alkyl; and p is 0 to 5.

12. The method of claim 1, wherein the poly(alkenyl aromatic) resin comprises at least one poly(alkenyl aromatic) resin selected from the group consisting of atactic homopolystyrene, syndiotactic homopolystyrene, rubber-modified polystyrene, and mixtures comprising at least one of the foregoing poly(alkenyl aromatic) resins.

13. The method of claim 1, wherein the first intimate blend comprises about 1 to about 46 weight percent poly (alkenyl aromatic) resin, based on the total weight of the composition.

14. The method of claim 1, wherein the hydrogenated block copolymer comprises:

(A) at least one block derived from an alkenyl aromatic compound having the formula

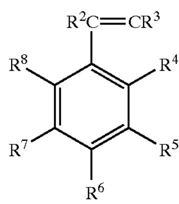

wherein $R^2$ and $R^3$ each represent a hydrogen atom, a $C_1$–$C_8$ alkyl group, or a $C_2$–$C_8$ alkenyl group; $R^4$ and $R^8$ each represent a hydrogen atom, a $C_1$–$C_8$ alkyl group, a chlorine atom, or a bromine atom; and $R^5$–$R^7$ each independently represent a hydrogen atom, a $C_1$–$C_8$ alkyl group, or a $C_2$–$C_8$ alkenyl group, or $R^4$ and $R^5$ are taken together with the central aromatic ring to form a naphthyl group, or $R^5$ and $R^6$ are taken together with the central aromatic ring to form a naphthyl group; and (B) at least one block derived from a conjugated diene, in which the aliphatic unsaturated group content in the block (B) is reduced by hydrogenation.

15. The method of claim 1, wherein the hydrogenated block copolymer has an alkenyl aromatic content of about 10 to about 90 weight percent.

16. The method of claim 1, wherein the hydrogenated block copolymer has an alkenyl aromatic content of about 40 to about 90 weight percent.

17. The method of claim 1, wherein the hydrogenated block copolymer has an alkenyl aromatic content of about 50 to about 90 weight percent.

18. The method of preparing the thermoplastic composition of claim 1, wherein the hydrogenated block copolymer comprises a styrene-(ethylene-butylene)-styrene triblock copolymer.

19. The method of claim 1, wherein the first intimate blend comprises about 1 to about 20 weight percent hydrogenated block copolymer, based on the total weight of the composition.

20. The method of claim 1, wherein the wherein the unhydrogenated block copolymer comprises a styrene-butadiene diblock copolymer or a styrene-butadiene-styrene triblock copolymer.

21. The method of claim 1, wherein the first intimate blend comprises about 1 to about 20 weight percent of the unhydrogenated block copolymer, based on the total weight of the composition.

22. The method of claim 1, wherein the polyolefin comprises a homopolymer or copolymer having at least about 80 weight percent of units derived from polymerization of ethylene, propylene, butylene, or a mixture thereof.

23. The method of claim 1, wherein the polyolefin is a propylene polymer comprising a homopolymer of polypropylene; or a random, graft, or block copolymer of propylene and at least one olefin selected from ethylene and $C_4$–$C_{10}$ alpha-olefins, with the proviso that the copolymer comprises at least about 80 weight percent of repeating units derived from propylene.

24. The method of claim 1, wherein the polyolefin comprises a homopolypropylene.

25. The method of claim 1, wherein the second intimate blend comprises about 10 to about 60 weight percent polyolefin, based on the total weight of the composition.

26. The method of claim 1, wherein the additional hydrogenated block copolymer used to form the second intimate blend is the same as the hydrogenated block copolymer used to form the first intimate blend.

27. The method of claim 1, wherein the additional hydrogenated block copolymer used to form the second intimate blend is different from the hydrogenated block copolymer used to form the first intimate blend.

28. The method of claim 1, wherein the additional hydrogenated block copolymer used to form the second intimate blend is a styrene-(ethylene-butylene)-styrene triblock copolymer having a styrene content of about 50 to about 90 weight percent.

29. The method of claim 1, wherein the amount of the additional hydrogenated block copolymer is about 1 to about 20 weight percent, based on the total weight of the composition.

30. The method of claim 1, wherein the first intimate blend and/or the second intimate blend further comprises a polypropylene-polystyrene copolymer selected from the group consisting of graft copolymers, diblock copolymers, multiblock copolymers, radial block copolymers, and combinations comprising at least one of the foregoing polypropylene-polystyrene copolymers.

31. The method of claim 30, wherein the polypropylene-polystyrene copolymer is a graft copolymer having a propylene polymer backbone and one or more styrene polymer grafts.

32. The method of claim 31, wherein the polypropylene-polystyrene graft copolymer comprises about 50 to about 85 weight percent of the propylene polymer backbone and about 15 to about 50 weight percent of the styrene polymer grafts.

33. The method of claim 30, wherein the polypropylene-polystyrene copolymer is present in an amount of about 0.5 to about 30 weight percent, based on the total weight of the composition.

34. The method of claim 1, wherein the first intimate blend and/or the second intimate blend further comprises an ethylene/alpha-olefin elastomeric copolymer.

35. The method of claim 34, wherein the ethylene/alpha-olefin elastomeric copolymer is a copolymer of ethylene and at least one $C_3$–$C_{10}$ alpha-olefin.

36. The method of claim 34, wherein the ethylene/alpha-olefin elastomeric copolymer is an ethylene-butylene rubber, an ethylene-propylene rubber, or a mixture thereof.

37. The method of claim 34, wherein the ethylene/alpha-olefin elastomeric copolymer is present in an amount of about 1 to about 20 weight percent, based on the total weight of the composition.

38. The method of claim 1, wherein the second intimate blend further comprises at least one reinforcing filler.

39. The method of claim 38, wherein the reinforcing filler is selected from the group consisting of glass fibers, talc, quartz fibers, carbon fibers, potassium titanate fibers, silicon carbide fibers, boron carbide fibers, gypsum fibers, aluminum oxide fibers, iron fibers, nickel fibers, copper fibers, wollastonite fibers, poly(ether ketone) fibers, polyimide benzoxazole fibers, poly(phenylene sulfide) fibers, polyester fibers, aromatic polyamide fibers, aromatic polyimide fibers, aromatic polyetherimide fibers, acrylic fibers, poly(vinyl alcohol) fibers, polytetrafluoroethylene fibers, and combinations comprising at least one of the foregoing reinforcing fillers.

40. The method of claim 38, wherein the reinforcing filler is glass fibers.

41. The method of claim 38, wherein the second intimate blend further comprises a graft copolymer comprising a polyolefin backbone and polar grafts formed from one or more cyclic anhydrides.

42. The method of claim 1, further comprising blending the second intimate blend with at least one reinforcing filler.

43. The method of claim 1, further comprising blending the second intimate blend with at least one reinforcing filler and a graft copolymer comprising a polyolefin backbone and polar grafts formed from one or more cyclic anhydrides.

44. The method of claim 1, wherein the first intimate blend and/or the second intimate blend further comprises an additive selected from the group consisting of stabilizers, mold release agents, processing aids, flame retardants, drip retardants, nucleating agents, UV blockers, dyes, pigments, antioxidants, antistatic agents, and combinations comprising at least one of the foregoing additives.

45. A method of preparing a thermoplastic composition, comprising:

melt-blending to form a first intimate blend comprising about 10 to about 59 weight percent of a poly(arylene ether);

about 1 to about 46 weight percent of a poly(alkenyl aromatic) resin;

about 1 to about 20 weight percent of a hydrogenated block copolymer of alkenyl aromatic compound and a conjugated diene; and about 1 to about 20 weight percent of an unhydrogenated block copolymer of an alkenyl aromatic compound and a conjugated diene; and melt-blending about 10 to about 60 weight percent of a polyolefin and about 1 to about 20 weight percent of additional hydrogenated block copolymer with the first intimate blend to form a second intimate blend comprising the first intimate blend, about 10 to about 60 weight percent of the polyolefin, and about 1 to about 20 weight percent of additional hydrogenated block copolymer;

wherein all weight percents are based on the total weight of the composition.

46. A method of preparing a thermoplastic composition, comprising:

melt-blending to form a first intimate blend comprising about 10 to about 59 weight percent of a poly(arylene ether) comprising 2,6-dimethyl-1,4-phenylene ether units, 2,3,6-trimethyl-1,4-phenylene ether units, or a combination thereof;

about 1 to about 46 weight percent of polystyrene or rubber-modified polystyrene;

about 1 to about 20 weight percent of a styrene-(ethylene-butylene)-styrene block copolymer having a styrene content of about 50 to about 90 weight percent; and about 1 to about 20 weight percent of a styrene-butadiene-styrene block copolymer; and melt-blending about 10 to about 60 weight percent of polypropylene, about 1 to about 20 weight percent of additional styrene-(ethylene-butylene)-styrene block copolymer having a styrene content of about 50 to about 90 weight percent, and about 1 to about 20 weight percent of ethylene-butylene rubber or ethylene-propylene rubber with the first intimate blend to form a second intimate blend comprising the first intimate blend, about 10 to about 60 weight percent of the polypropylene, about 1 to about 20 weight percent of additional styrene(ethylene-butylene)-styrene block copolymer having a styrene content of about 50 to about 90 weight percent, and about 1 to about 20 weight percent of ethylene-butylene rubber or ethylene-propylene rubber;

wherein all weight percents are based on the total weight of the composition.

* * * * *

UNITED STATES PATENT AND TRADEMARK OFFICE

CERTIFICATE OF CORRECTION

PATENT NO. : 6,908,964 B2
DATED : June 21, 2005
INVENTOR(S) : Adedeji et al.

It is certified that error appears in the above-identified patent and that said Letters Patent is hereby corrected as shown below:

Column 9,
Line 64, after “polyolefins” delete “are”.

Column 29,
Line 40, after “1”, delete “wherein the” (first occurrence).

Signed and Sealed this

Sixth Day of December, 2005

JON W. DUDAS
*Director of the United States Patent and Trademark Office*